(12) United States Patent
Ekonen et al.

(10) Patent No.: US 7,635,055 B2
(45) Date of Patent: *Dec. 22, 2009

(54) TORQUE COUPLING WITH ACTUATOR SYSTEM FOR ADAPTIVE CLUTCH AND DISCONNECTABLE LUBRICATION PUMP

(75) Inventors: Todd Ekonen, Howell, MI (US); Philip J. Francis, Lapeer, MI (US)

(73) Assignee: Magna Powertrain USA, Inc., Troy, MI (US)

( * ) Notice: Subject to any disclaimer, the term of this patent is extended or adjusted under 35 U.S.C. 154(b) by 394 days.

This patent is subject to a terminal disclaimer.

(21) Appl. No.: 11/518,607

(22) Filed: Sep. 8, 2006

(65) Prior Publication Data

US 2007/0056824 A1 Mar. 15, 2007

Related U.S. Application Data

(60) Provisional application No. 60/716,381, filed on Sep. 12, 2005.

(51) Int. Cl.
*F16D 28/00* (2006.01)
*F16D 27/12* (2006.01)
*F16D 13/24* (2006.01)
*F16D 13/54* (2006.01)

(52) U.S. Cl. .............. 192/20; 192/48.2; 192/48.7; 192/84.6; 192/84.7

(58) Field of Classification Search ............. 192/48.7, 192/113.35
See application file for complete search history.

(56) References Cited

U.S. PATENT DOCUMENTS

| 5,310,388 | A | 5/1994 | Okcuoglu et al. | |
|---|---|---|---|---|
| 5,827,145 | A | 10/1998 | Okcuoglu | |
| 6,378,682 | B1 | 4/2002 | Mohan et al. | |
| 6,564,917 | B2 * | 5/2003 | Katou et al. | 192/84.7 |
| 6,626,787 | B2 | 9/2003 | Porter | |
| 7,361,114 | B2 | 4/2008 | Boddy | |
| 7,452,301 | B2 | 11/2008 | Yoshioka | |
| 7,533,754 | B2 | 5/2009 | Burrows et al. | |
| 2004/0163916 | A1 * | 8/2004 | Showalter | 192/48.2 |
| 2004/0188216 | A1 * | 9/2004 | Yamazaki | 192/84.6 |
| 2007/0056823 | A1 * | 3/2007 | Ekonen et al. | 192/35 |

* cited by examiner

*Primary Examiner*—Rodney H Bonck
(74) *Attorney, Agent, or Firm*—Harness, Dickey & Pierce, P.L.C.

(57) ABSTRACT

A torque coupling having an actuation system operable to control actuation of a transfer clutch in coordination with actuation of a pump clutch. The transfer clutch is disposed between a pair of rotary members to transfer drive torque therebetween. The pump clutch is operable for selectively coupling a fluid pump to the first rotary member when lubricant is required to cool the transfer clutch.

24 Claims, 9 Drawing Sheets

TORQUE COUPLING WITH ACTUATOR SYSTEM FOR ADAPTIVE CLUTCH AND DISCONNECTABLE LUBRICATION PUMP

CROSS-REFERENCE TO RELATED APPLICATIONS

This application claims benefit to U.S. Provisional Application No. 60/716,381 filed Sep. 12, 2005, the entire disclosure of which is hereby incorporated by reference.

FIELD OF THE INVENTION

The present invention relates generally to torque couplings for use in vehicular power transfer systems and, more particularly, to torque couplings equipped with a mechanism for selectively connecting a fluid pump.

BACKGROUND OF THE INVENTION

Power transfer systems of the type used in motor vehicles including, but not limited to, transfer cases, power take-off units (PTU) and drive axles are commonly equipped with a torque biasing system. Typical torque biasing systems function to regulate the transfer of drive torque between an input and an output. Typically, a multi-plate friction clutch pack is operably disposed between the input and the output and engagement of the clutch pack is varied to regulate the amount of drive torque transferred from the input to the output. For example, there is no torque transfer from the input to the output when the clutch pack is disengaged. In contrast, all of the drive torque is transferred from the input to the output when the clutch pack is fully engaged. When the clutch pack is partially engaged, a corresponding portion of the drive torque is transferred.

The degree of clutch pack engagement is adjusted by an engagement force that is imparted on the clutch pack via a clutch actuator system. Traditional clutch actuator systems include a power-operated drive mechanism that is operable to drive a clutch operator mechanism. The clutch operator mechanism converts the force or torque generated by the power-operated drive mechanism into the engagement force, which can be amplified prior to being applied to the clutch pack. The power-operated drive mechanism is typically controlled based on control signals generated by an electronic control system.

The quality and accuracy of torque transfer across the clutch pack is based on the frictional interface between the clutch plates. When the clutch pack is partially engaged, the clutch plates slip relative to one another and generate heat. To remove such heat, lubricating fluid is typically directed through the clutch pack to cool the plates as well as other clutch pack components. Excessive heat generation, however, can degrade the lubricating fluid and damage the clutch plates and/or the clutch pack components. Additionally, traction control systems require the clutch control system to respond to torque commands in a quick and accurate manner. The accuracy of meeting the torque request is largely dependent on the coefficient of friction of the clutch pack. It has been demonstrated that this coefficient can change quite rapidly under various loading and/or slip conditions. In particular, the coefficient tends to fade due to significant temperature increases in the clutch pack which result from insufficient rate of heat removal. The heat removal rate is primarily dependent upon the flow rate and condition of the lubricating fluid.

Traditional lubrication systems typically include a shaft-driven fluid pump that supplies the lubricating fluid to the clutch pack. The fluid pump is usually a unidirectional pump such that it provides no fluid flow when the vehicle is in the reverse mode of operation, even though torque requests may still occur. For instance, the vehicle may be subjected to backing up a dirt, gravel or snow-packed hill where operation in the AWD/4WD mode may be needed. Additionally, shaft-driven pumps are always driven when the vehicle is in forward motion. In many cases, however, the flow of lubricating fluid is not required until heat is actually generated on the highly loaded components, such as during clutch slip conditions. Furthermore, because shaft-driven fluid pumps are always pumping, inefficiencies are realized and fuel economy is negatively impacted.

Another shortfall of traditional lubrication systems is the increased pump capacity required to deliver sufficient lubricating fluid to the clutch pack at lower shaft speeds. Low shaft speeds are typically encountered in parking lot maneuvers, where tests for torque accuracy are typically performed. Increasing the pump capacity further increases the negative impact the lubrication system has on fuel economy, as well as creating potential for pump cavitation at higher shaft speeds.

Thus, a need exists to provide an improved lubrication system for use in torque couplings of the type used in vehicular power transfer systems. The improved lubrication system would overcome the drawbacks associated with conventional lubrication systems by providing superior heat removal characteristics while aiding in extending the service life of the clutch plates.

SUMMARY OF THE INVENTION

It is an objective of the present invention to provide an on-demand lubrication system for power transfer assemblies of the type used for transferring drive torque and/or limiting slip in vehicular driveline applications.

It is another objective of the present invention to provide an on-demand lubrication system having a fluid pump and a pump clutch that is operable to shift the fluid pump between an operative state and a non-operative state.

A related objective of the present invention is related to providing the pump clutch with a mechanism for selectively coupling and uncoupling a pump component of the fluid pump to a driven shaft for establishing its operative and non-operative states.

It is yet another objective of the present invention to provide the power transfer assembly with a torque transfer mechanism having a clutch actuation system that is operable for controlling coordinated actuation of the pump clutch and a torque transfer clutch operably disposed between a pair of rotary members.

Accordingly, the present invention provides a pump system for selectively pressurizing a fluid. The pump system includes a shaft, a fluid pump having a pump component that can selectively driven by the shaft, and a pump clutch. When driven by the shaft, the pump component generates a pumping action that is operable for drawing low pressure fluid from a sump and a discharging fluid at a higher pressure. The pump clutch is operable to selectively couple the pump component to the shaft and can be selectively shifted between a decoupled state and a coupled state for regulating functional operation of the fluid pump.

In addition, the present invention is directed to a torque coupling having an actuation system operable to control actuation of a multi-plate friction clutch in coordination with actuation of the pump clutch. The actuation system includes an electric motor, a gearset driven by the electric motor, a control gear driven by the gearset, a first cam operator disposed between the control gear and the friction clutch and a second cam operator disposed between the control gear and the pump clutch. The first cam operator includes a pair of first rollers mounted to the control gear which engage a first cam surface formed on a first cam plate while the second cam operator includes a pair of second rollers mounted to the control gear which engage a second cam surface formed on a second cam plate. The profile of the first cam surface controls axial movement of the first cam plate relative to the friction clutch in response to rotation of the control gear. Similarly, the profile of the second cam surface controls axial movement of the second cam plate relative to the pump clutch in response to rotation of the control gear.

BRIEF DESCRIPTION OF THE DRAWINGS

Further objects, features and advantages of the present invention will become apparent to those skilled in the art from analysis of the following written description, the appended claims, and accompanying drawings in which:

DETAILED DESCRIPTION OF THE PREFERRED EMBODIMENTS

The present invention is directed to a torque transfer mechanism that can be adaptively controlled for modulating the torque transferred from a first rotary member to a second rotary member. The torque transfer mechanism finds particular application in power transfer systems for use in motor vehicle. Thus, while the present invention is hereinafter described in association with a particular arrangement for use in a specific driveline application, it will be understood that the arrangement shown and described is merely intended to illustrate possible embodiments of the present invention.

Figure 1:
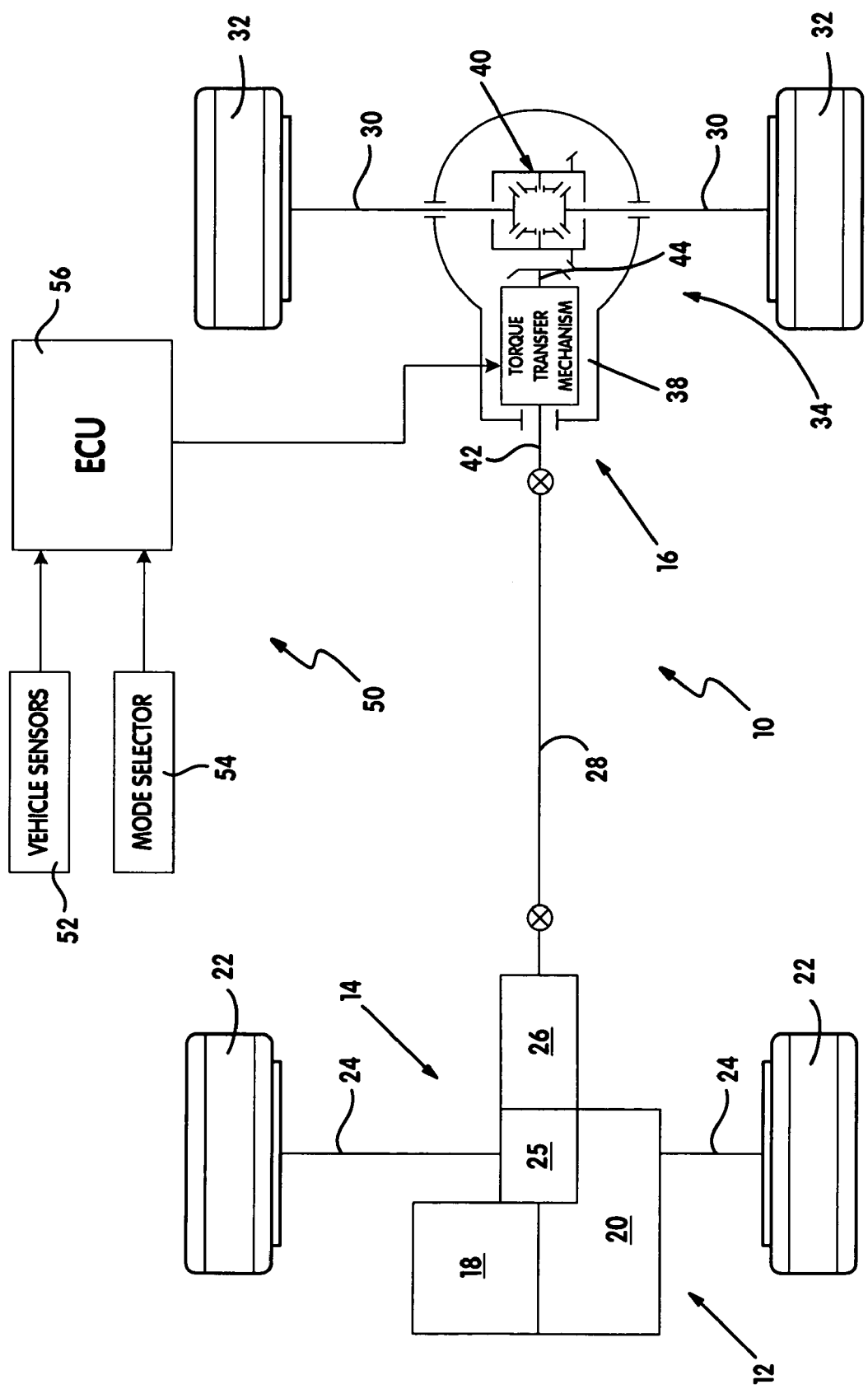
FIG. 1 illustrates an exemplary drivetrain of a four-wheel drive vehicle equipped with a power transfer system having a torque transfer mechanism according to the present invention.

With particular reference to FIG. 1, a schematic layout of an exemplary vehicle drivetrain 10 is shown to include a powertrain 12, a first or primary driveline 14 driven by powertrain 12, and a second or secondary driveline 16. Powertrain 12 includes an engine 18 and a multi-speed transaxle 20 arranged to normally provide motive power (i.e., drive torque) to a pair of first wheels 22 associated with primary driveline 14. Primary driveline 14 further includes a pair of axleshafts 24 connecting wheels 22 to a differential unit 25 associated with transaxle 20.

Secondary driveline 16 includes a power take-off unit (PTU) 26 driven by the output of differential unit 25 within transaxle 20, a propshaft 28 driven by PTU 26, a pair of axleshafts 30 connected to a pair of second wheels 32, and a power transfer device 34 that is operable to selectively transfer drive torque from propshaft 28 to axleshafts 30. Power transfer device 34 is provided as a drive axle assembly and includes a torque transfer mechanism 38 and a differential unit 40. Torque transfer mechanism 38 functions to selectively transfer drive torque from propshaft 28 to differential unit 40 which, in turn, drives axleshaft 30. More specifically, torque transfer mechanism 38 includes an input shaft 42 driven by propshaft 28 and a pinion shaft 44 that drives differential unit 40.

Vehicle drivetrain 10 further includes a control system 50, vehicle sensors 52 and a mode select mechanism 54. Control system 50 regulates actuation of torque transfer mechanism 38. Vehicle sensors 52 detect dynamic and operational characteristics of drivetrain 10. Mode select mechanism 54 enables an operator to select one of a plurality of available drive modes. In this embodiment, drive modes include a two-wheel drive mode, a locked ("part-time") four-wheel drive mode, and an adaptive ("on-demand") four-wheel drive mode. In this regard, torque biasing mechanism 38 can be selectively engaged for transferring drive torque from input shaft 42 to pinion shaft 44 for establishing both of the part-time and on-demand four-wheel drive modes. An electronic control unit (ECU) 56 controls operation of the components associated with control system 50 which, in turn, controls torque transfer mechanism 38.

Figure 2:
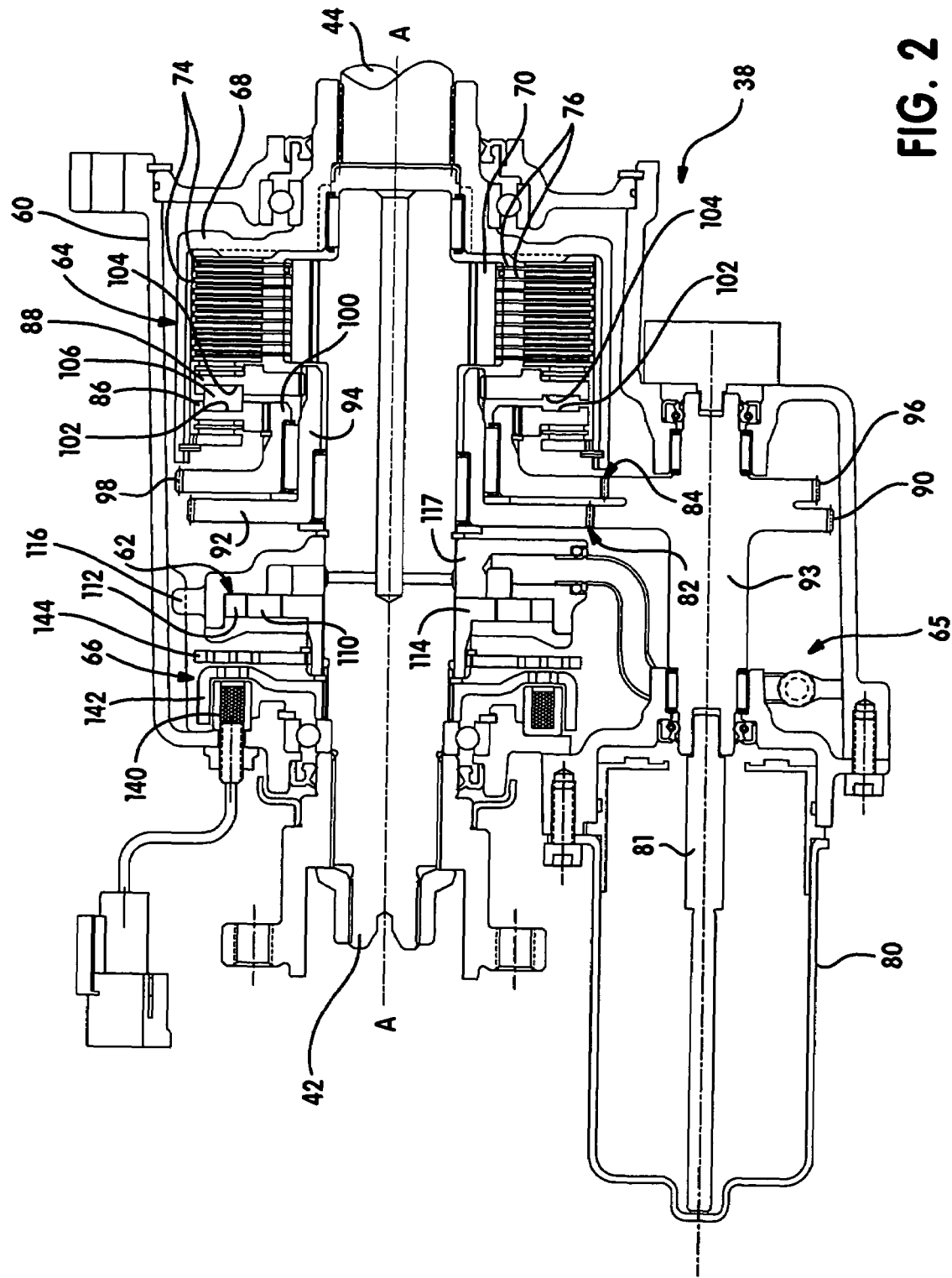
FIG. 2 is a sectional view of a torque transfer mechanism having a pump clutch operable for selectively engaging a fluid pump according to a first embodiment of the present invention.

Referring now to FIG. 2, a partial cross-section of torque transfer mechanism 38 is illustrated. Torque transfer mechanism 38 includes a housing 60 that encloses a hydraulic pump 62, a transfer clutch 64, a clutch actuator 65 and a pump clutch 66. In operation, input shaft 42 is selectively coupled to pinion shaft 44 via engagement of transfer clutch 64. Transfer clutch 64 is varied between a disengaged state and an engaged state to regulate torque transfer between input shaft 42 and pinion shaft 44. More specifically, clutch actuator 65 regulates the degree of engagement of a clutch pack associated with transfer clutch 64, as described in further detail below. Hydraulic pump 62 is operable to provide pressurized fluid for cooling the clutch pack based on rotation of input shaft 42. In addition, pump clutch 66 is operable to regulate the pumping action of pump 62. More specifically, pump clutch 66 regulates operation of pump 62 between a disengaged state and an engaged state to vary the pressure of the fluid discharged therefrom, as explained in further detail below.

Transfer clutch 64 includes a drum 68 that is fixed for rotation with pinion shaft 44 and a hub 70 that is fixed for rotation with input shaft 42. A first plurality of clutch plates 74 are fixed to drum 68 and extend radially inward. A second plurality of clutch plates 76 are fixed to hub 70 and extend radially outward and are interleaved with clutch plates 74. The degree of engagement of the multi-plate clutch pack, and therefore the amount of torque transferred therethrough, is based on the interaction of clutch plates 74 and 76. More specifically, in a disengaged state, clutch plates 74 and 76 slip relative to one another and no torque is transferred through transfer clutch 64. In a fully engaged state, there is no relative slip between clutch plates 74 and 76 and 100% of the drive torque is transferred from input shaft 42 to pinion shaft 44. In a partially engaged state, the degree of relative slip between clutch plates 74 and 76 varies and a corresponding amount of drive torque is transferred through transfer clutch 64.

Clutch actuator 65 controls the degree of clutch pack engagement and includes an electric motor 80 having a motor shaft 81 driving first and second gearsets 82 and 84, a reaction cam plate 86 and an engagement cam plate 88. First gearset 82 includes a first pinion gear 90 that is meshed with a first drive gear 92. First pinion gear 90 is integrally formed on a stub shaft 93 that is driven by motor shaft 81. In addition, first drive gear 92 is integrally formed on a first tubular hub 94 that is rotatably supported on input shaft 42. Second gearset 84 includes a second pinion gear 96 formed on stub shaft 93 and which is meshed with a second drive gear 98. Second drive gear 98 is integrally formed on a second tubular hub 100 that is rotatably supported on first hub 94. As seen, first hub 94 is in splined engagement with engagement cam plate 88 while second hub 100 is in splined engagement with reaction cam plate 86. Reaction cam plate 86 includes one or more ramped grooves 102 while engagement plate 88 also includes a corresponding number of ramped grooves 104. Rolling elements 106 are disposed between reaction cam plate 86 and engagement cam plate 88 and ride within aligned sets of ramped grooves 102 and 104.

Electric motor 80 induces common rotation of first pinion gear 90 and second pinion gear 96 which, in turn, respectively drive first and second drive gears 92 and 98. The number of gear teeth selected for the gear components of first gearset 82 and second gearset 84 are adapted to generate relative rotation between first hub 94 and second hub 100 in response to rotation of motor shaft 81. Accordingly, such relative rotation results in similar relative rotation between reaction cam plate 86 and engagement cam plate 88. As engagement cam plate 88 rotates relative to reaction cam plate 86, rolling elements 106 ride within ramped grooves 102 and 104 and cause engagement cam plate 88 to move axially relative to reaction cam plate 86. In this manner, engagement cam plate 88 is capable of exerting a linearly-directed clutch engagement force on the clutch pack so as to regulate engagement of transfer clutch 64.

Pump 62 is shown as a gerotor-type pump and includes an inner pump rotor 110 and an outer pump rotor 112. As will be detailed, inner pump rotor 110 is selectively coupled to input shaft 42 through pump clutch 66. Inner rotor 110 is fixed (i.e., splined) for common rotation with a pump hub 114. Pump hub 114 is concentrically aligned with and free to rotate about input shaft 42. Outer pump rotor 112 is supported in a pump housing 116 which is non-rotatably fixed via a splined connection 118 to housing 60. Pumping chambers are defined between the inner and outer pump rotors. The volume of the pumping chambers varies based on relative rotation between inner and outer rotors 110 and 112. More specifically, when inner pump rotor 110 is caused to rotate at a different speed than outer pump rotor 112, the pumping chambers are induced to expand and contract. Expansion of the pumping chambers draws fluid into a pumping chamber from a sump while contraction of a pumping chamber pressurizes and discharges the fluid from pump 62. As seen in FIG. 2, fluid from the sump is drawn through an inlet hose 120 to an inlet chamber 122 of pump 62. The higher pressure fluid is discharged into an outlet chamber 124 and is supplied via flow paths to lubricate and cool the clutch pack as well as other rotary components and bearings.

Pump clutch 66 includes an electromagnetic (EM) actuator 140, a first clutch plate 142 and a second clutch plate 144. EM actuator 140 is fixed to housing 60 and first clutch plate 142 is splined to input shaft 42 for common rotation therewith. Second clutch plate 144 is fixed (i.e., splined) for rotation with inner rotor 110 of pump 62 via hub 114 and is slidable along the axis A. Specifically, second clutch plate 144 is coupled via a splined connection 146 to hub 114. Pump clutch 66 is operable in a first or "engaged" state to couple inner rotor 110 for rotation with input shaft 42 and in a second or "disengaged" state to de-couple inner rotor 110 from rotation with input shaft 42. More specifically, when EM coil 140 is energized, second clutch plate 144 slides along the A axis and is coupled to first clutch plate 142. In this manner, inner rotor 110 is driven by input shaft 42 through engagement of first and second clutch plate 142 and 144 so as to permit pump 62 to generate the fluid pumping action. When EM coil 140 is de-energized, second clutch plate 144 is free to rotate independent of first clutch plate 142, whereby inner rotor 110 is not driven by input shaft 42. EM coil 140 receives electric control signals from ECU 56.

Figure 3:
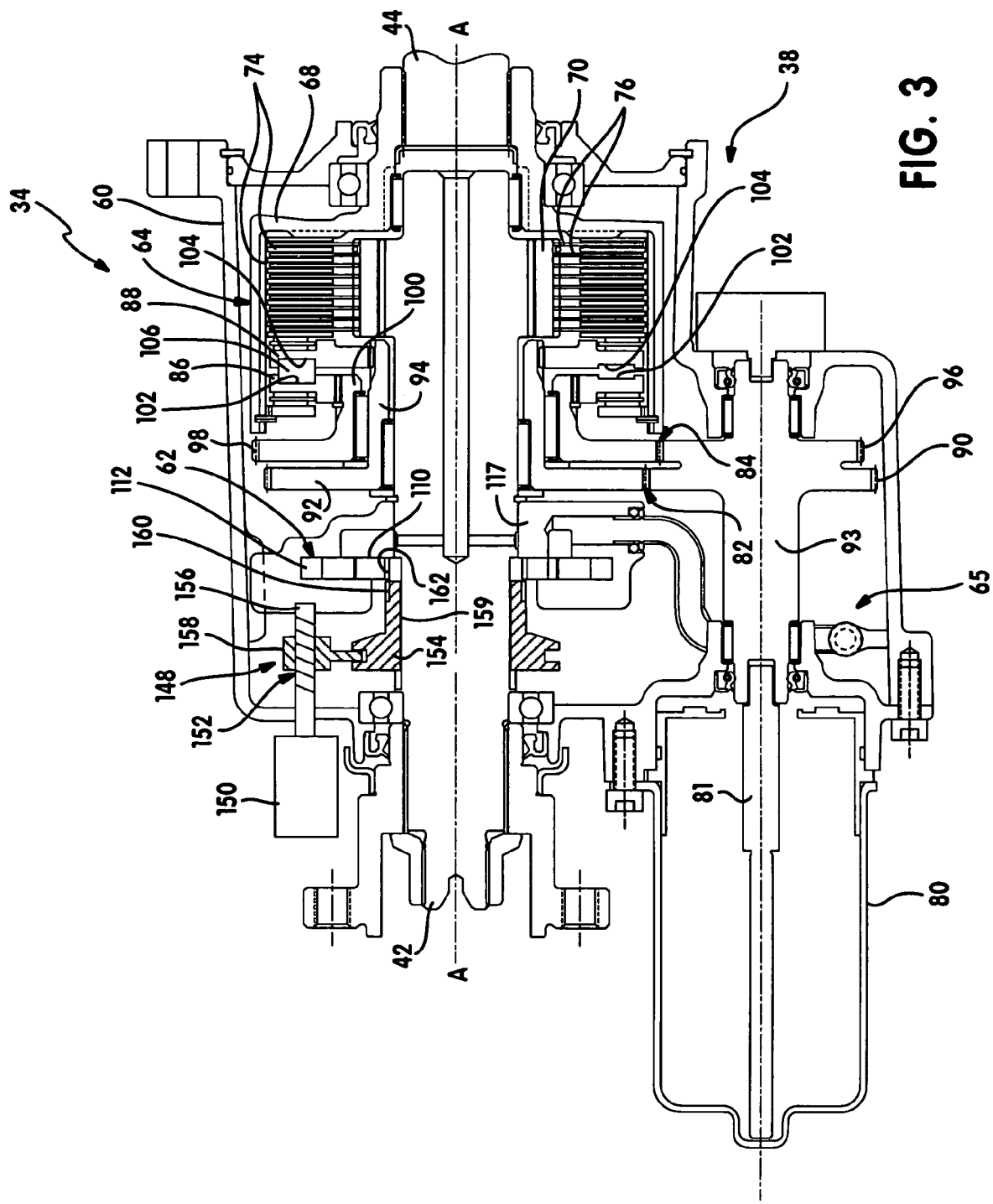
FIG. 3 is a sectional view of a torque transfer mechanism having a pump clutch operable for selectively engaging a fluid pump according to a second embodiment of the present invention.

Referring now to FIG. 3, torque transfer mechanism 38 is now shown to include an alternative pump clutch 148 that selectively enables pump 62 to pump cooling fluid to the clutch pack of transfer clutch 64. Pump clutch 148 includes an electric motor 150, a screw drive mechanism 152 and a sliding hub 154. Screw drive mechanism 152 includes a threaded shaft 156 driven by electric motor 150 and a collar 158 that is in threaded engagement with threaded shaft 156 and which is axially movable along the axis of threaded shaft 156. Collar 158 engages hub 154 to axially move hub 154 along the A axis of input shaft 42. Hub 154 is fixed for rotation with input shaft 42 via a splined engagement 159. Hub 154 includes external clutch teeth 160 that can selectively engage internal clutch teeth 162 on inner rotor 110 of pump 62. In a disengaged mode, motor 150 drives screw 156 until collar 158 is retracted, whereby hub 154 is also moved to a retracted position. As such, clutch teeth 160 on hub 154 are moved out of engagement with clutch teeth 162 on inner rotor 110, whereby no fluid is pumped through pump 62. In an engaged mode, electric motor 150 drives screw 156 until collar 158 axially moves hub 154 to an extended position whereat its clutch teeth 160 engage clutch teeth 162 on inner rotor 110, thereby fixing inner rotor 110 for rotation with hub 154. In this manner, inner rotor 110 can rotate relative to outer rotor 112 and fluid is pumped through pump 62.

Figure 4:
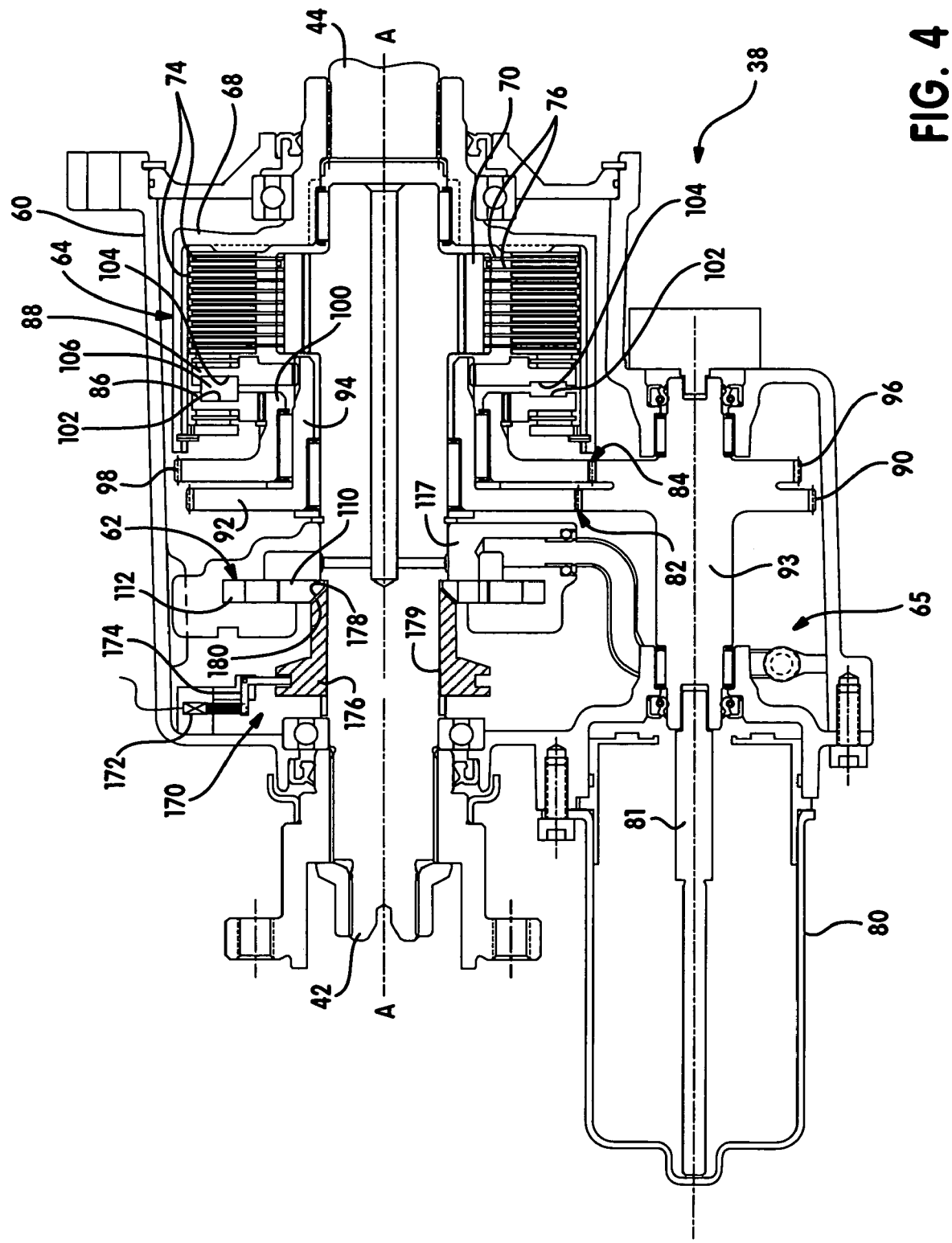
FIG. 4 is a sectional view of a torque transfer mechanism having a pump clutch operable for selectively engaging a fluid pump according to a third embodiment of the present invention.

Referring now to FIG. 4, torque transfer mechanism 38 is shown to include another alternative pump clutch 170 that selectively enables pump 62 to pump cooling fluid to the clutch pack. Pump clutch 170 includes an electro-magnetic (EM) solenoid 172, a lever 174 and a sliding hub 176. EM solenoid 172 is selectively energized and de-energized by control system 50. Lever 174 is generally L-shaped and is pivotally supported by housing 60. Lever 174 engages hub 176 to axially move hub 176 along the A axis. Hub 176 is fixed for rotation with input shaft 42 via a splined engagement 179. Hub 176 includes a conical face surface 178 that can selectively engage a conical face surface 180 formed on inner rotor 110 of pump 62. In a disengaged mode, EM solenoid 172 is de-energized and hub 176 is retracted such that its conical face surface 178 is released from engagement with conical face surface 180 on inner rotor 110, whereby no fluid is pumped through pump 62. In an engaged mode, EM solenoid 172 is energized to move lever 174 so as to engage inner rotor 110 and hub 176 for common rotation. In this manner, inner rotor 110 rotates relative to outer rotor 112 and fluid is pumped through pump 62.

Figure 5:
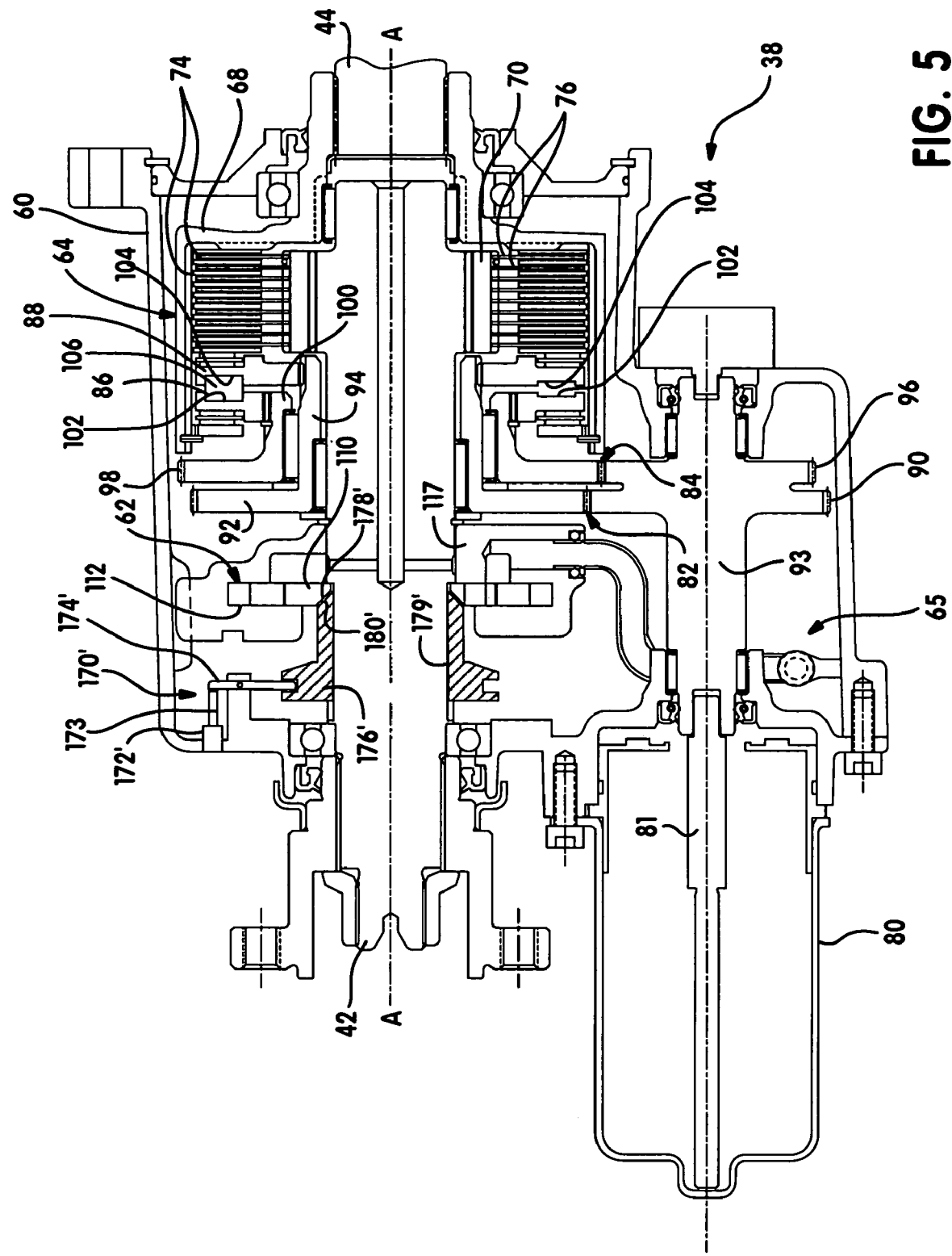
FIG. 5 is a sectional view of a torque transfer mechanism having a pump clutch operable for selectively engaging a fluid pump according to a fourth embodiment of the present invention.

Referring now to FIG. 5, torque transfer mechanism 38 is shown to include another alternative pump actuator 170' that selectively enables pump 62 to pump cooling fluid to the clutch pack of transfer clutch 64. The pump actuator 170' includes an electro-magnetic (EM) solenoid 172' having an axially displaceable plunger 173, a pivot lever 174' and a sliding hub 176'. EM solenoid 172' is selectively energized and de-energized by control system 50. Lever 174' is pivotally supported by housing 60. Lever 174' engages hub 176' to axially move hub 176' along the A axis in response to pivotal movement of lever 174'. Hub 176' is fixed for rotation with input shaft 42 via a splined engagement 179'. Hub 176' includes a conical face surface 178' that is adapted to selectively engage a conical face surface 180' on inner rotor 110 of pump 62. In a disengaged mode, EM solenoid 172' is de-energized and plunger 173 is extended such that hub 176' is retracted out of engagement with inner rotor 110, whereby no fluid is pumped through pump 62. In an engaged mode, EM solenoid 172' is energized to retract plunger 173 and extend lever 174' so as to engage inner rotor 110 and hub 176' for common rotation. In this manner, inner rotor 110 rotates relative to outer rotor 112 and fluid is pumped through pump 62.

Figure 6:
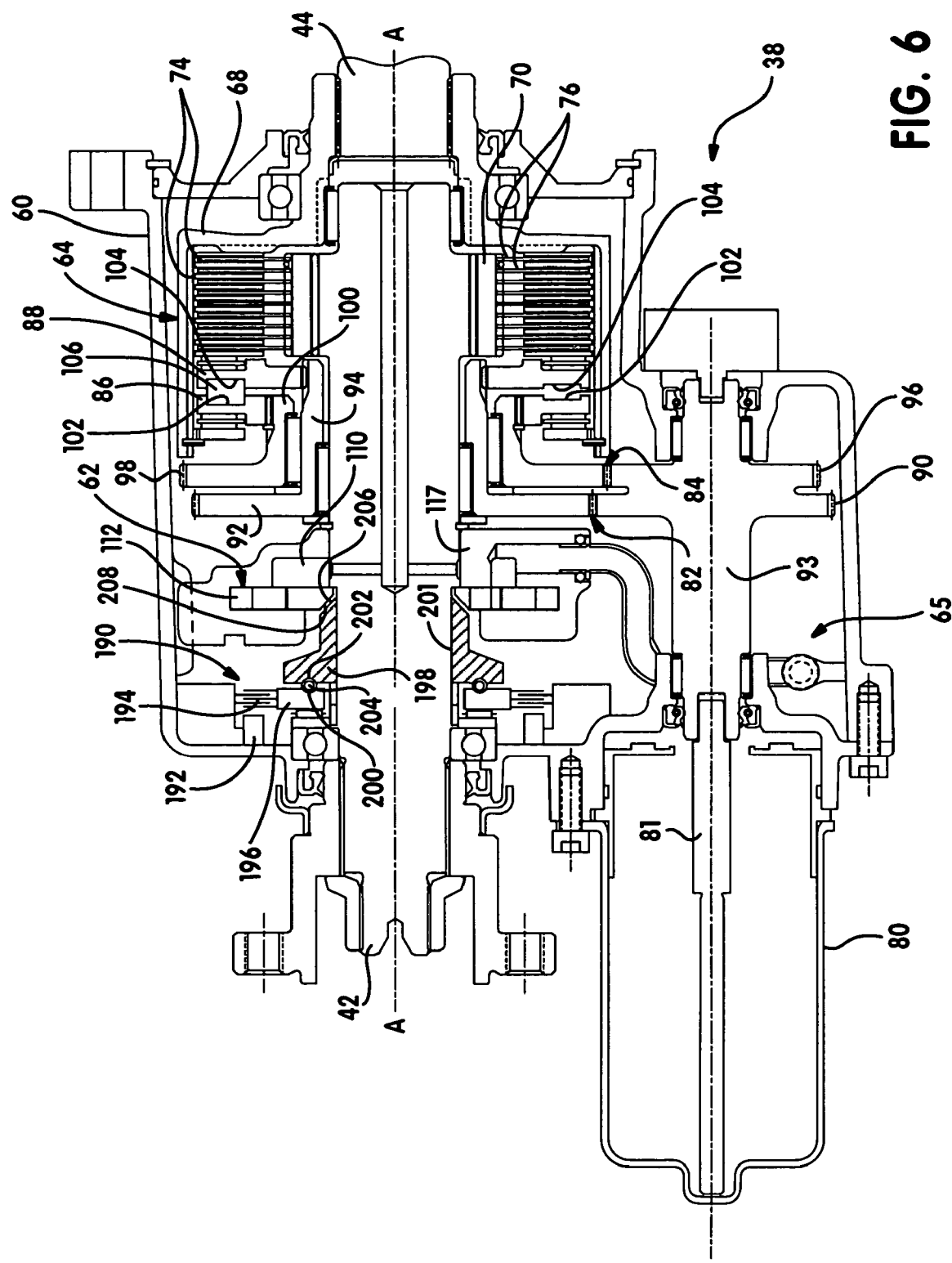
FIG. 6 is a sectional view of a torque transfer mechanism having a pump clutch operable for selectively engaging a fluid pump according to a fifth embodiment of the present invention.

Referring now to FIG. 6, torque transfer mechanism 38 includes still another alternative pump actuator 190 that selectively enables pump 62 to pump cooling fluid to the clutch pack of transfer clutch 64. Pump actuator 190 includes an electro-magnetic (EM) coil 192, a clutch pack 194 of interleaved clutch plates, a ball ramp unit 197 and a hub 198. Ball ramp unit 197 includes a stop plate 196 that is rotatably supported about input shaft 42 and has a ramped groove 200. Hub 198 is fixed for rotation with input shaft 42 via a splined engagement 201 and is axially movable along the A axis. Hub 198 also includes a ramped groove 202 that corresponds to ramped groove 200 of stop plate 196. A ball 204 rides within ramped grooves 200 and 202 to regulate the axial position of hub 198 along the A axis. Hub 198 further includes a conical face surface 206 that corresponds to a conical face surface 208 on inner rotor 110 of pump 62. The conical faces 206 and 208 can be placed in selective engagement so as to permit inner rotor 110 to rotate relative to outer rotor 112 and pump fluid through pump 62.

A first plurality of the clutch plates associated with clutch pack 194 are fixed to housing 60 and extend radially inward toward stop plate 196. A second plurality of clutch plates associated with clutch pack 194 are fixed for rotation with stop plate 196. In an engaged mode, EM coil 192 is energized to draw interleaved clutch plates 194 into engagement. In this manner, stop plate 196 is braked against rotation. As a result, hub 198 rotates relative to stop plate 196 inducing ball 204 to ride up ramped grooves 200 and 202. Ball 204 axially pushes hub 198 away from stop plate 196 and into engagement with inner rotor 110 to fix inner rotor 110 for rotation with hub 198. In a disengaged mode, EM coil 192 is de-energized and stop plate 196 is free to rotate about input shaft 42. As a result, ball 204 relieves pressure on hub 198 such that hub 198 is permitted to disengage inner rotor 110.

Figure 7:
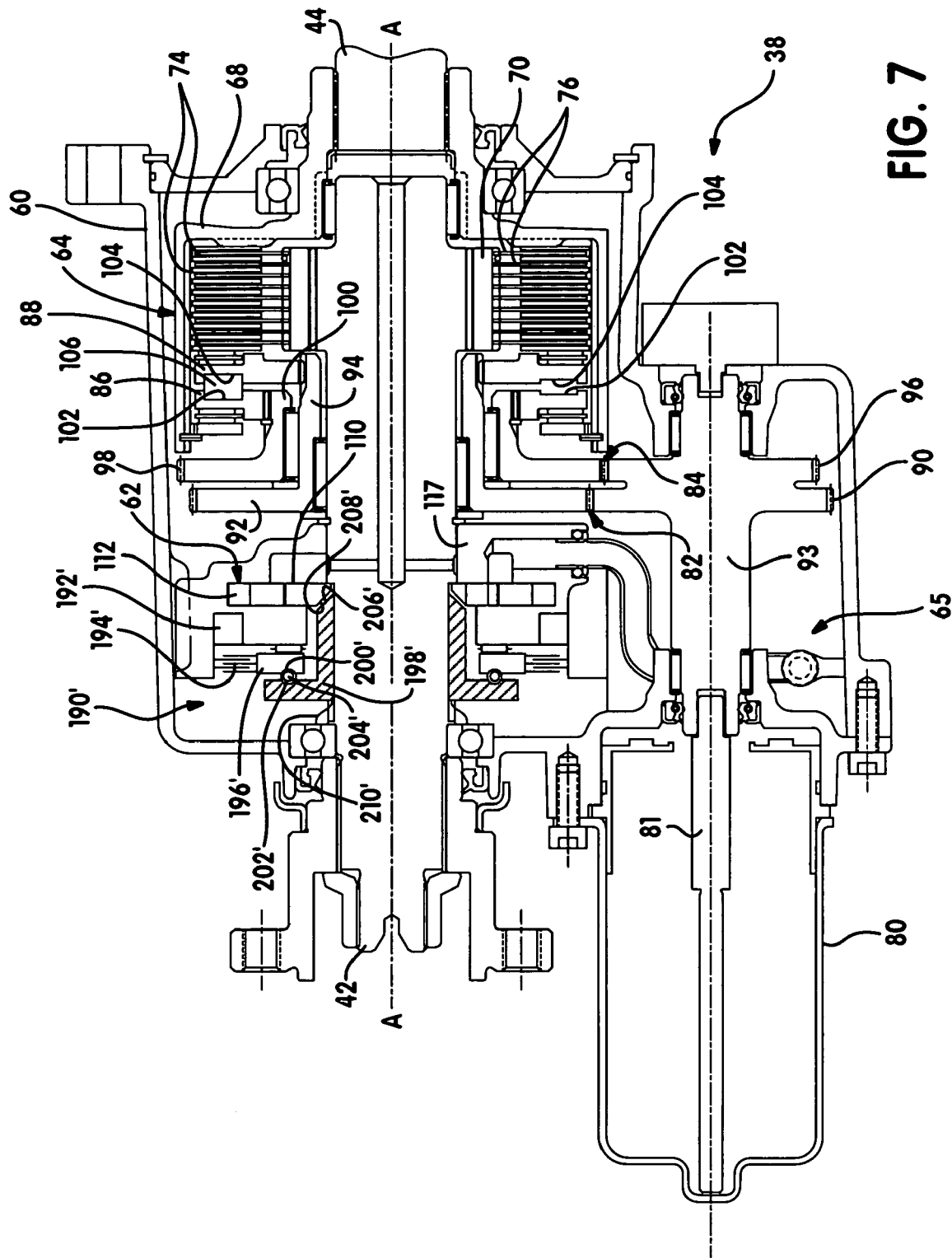
FIG. 7 is a sectional view of a torque transfer mechanism having a pump clutch operable for selectively engaging a fluid pump according to a sixth embodiment of the present invention.

Referring now to FIG. 7, torque transfer mechanism 38 is shown to include another alternative pump clutch 190' that selectively enables pump 62 to pump cooling fluid to the clutch pack of transfer clutch 64. Pump actuator 190' includes an electro-magnetic (EM) coil 192', a set of interleaved plates 194', a ball ramp unit 197' and a hub 198'. Ball ramp unit 197' includes a stop plate 196' that is rotatably supported about input shaft 42 and includes a ramped groove 200'. Hub 198' is fixed for rotation with input shaft 42 via a splined engagement 201' and is axially movable along the axis A. Hub 198' also includes a ramped groove 202' that corresponds to ramped groove 200' of stop plate 196'. A ball 204' rides within ramped grooves 200' and 202' to regulate a position of hub 198' along the axis A. Hub 198' further includes and a conical face 206' that corresponds to a conical face 208' of inner rotor 110 of pump 62. Conical faces 206 and 208 are in selective engagement to rotate inner rotor 110 relative to outer rotor 112 and pump through pump 62. A spring 210' biases hub 198' toward inner rotor 110.

A first plurality of interleaved plates 194' are fixed to housing 60 and extend radially inward toward stop plate 196'. A second plurality of interleaved plates 194' are fixed for rotation with stop plate 196'. In a disengaged mode, EM coil 192' is energized to draw interleaved plates 194' into engagement. In this manner, stop plate 196' is braked against rotation. As a result, hub 198' rotates relative to stop plate 196' inducing ball 204' to ride up ramped grooves 200' and 202'. Ball 204' pushes hub 198' away from stop plate 196' and against bias force of the spring 210'. In an engaged mode, EM coil 192' is de-energized and stop plate 196' is free to rotate about input shaft 42. As a result, ball 204' relieves pressure on hub 198' and hub 198 is pushed by the bias force of spring 210' into engagement with inner rotor 110.

Figure 8:
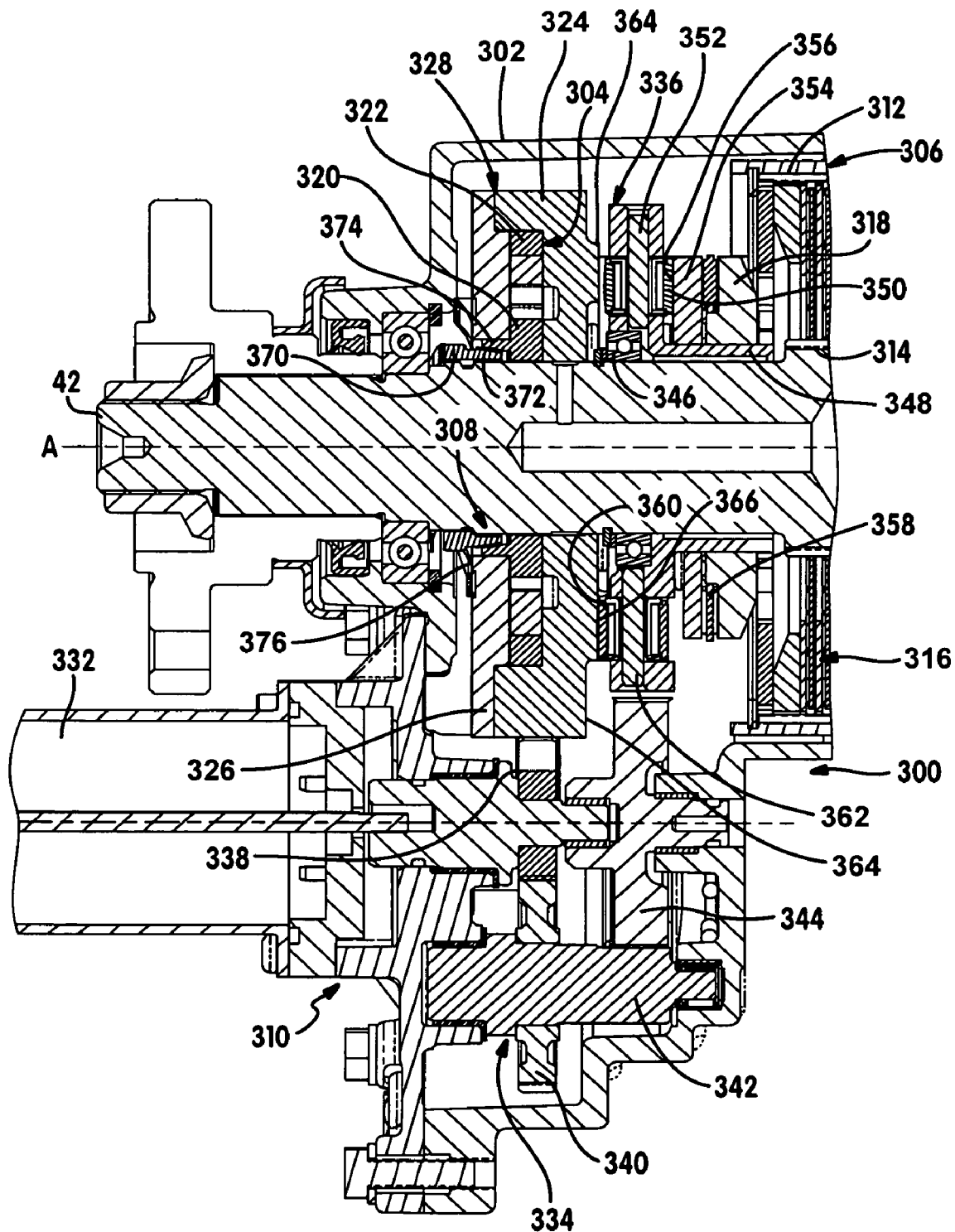
FIG. 8 is a sectional view of a torque transfer mechanism having a clutch actuation system operable for controlling actuation of a pump clutch for selectively engaging a fluid pump in coordination with actuation of a multi-plate torque transfer clutch.

Referring now to FIG. 8, a sectional view of a torque transfer mechanism 300 is illustrated. Torque transfer mechanism 300 includes a housing 302 that encloses a hydraulic pump 304, a transfer clutch 306, a pump clutch 308 and a clutch actuation system 310. In operation, input shaft 42 is selectively coupled to pinion shaft 44 via engagement of transfer clutch 306. Hydraulic pump 304 is selectively operable to provide pressurized fluid for cooling transfer clutch 306 and/or other rotary components based on rotation of input shaft 42 while pump clutch 308 functions to selectively couple a pump component of fluid pump 304 for rotation with input shaft 42. As will be detailed, clutch actuation system 310 functions to control actuation of transfer clutch 306 in coordination with actuation of pump clutch 308.

Transfer clutch 306 is shown to include a drum 312 that is fixed for rotation with pinion shaft 44, a clutch hub 314 that is fixed for rotation with input shaft 42, and a multi-plate clutch pack 316 having a set of first clutch plates splined to drum 312 which are interleaved with a set of second clutch plates splined to hub 314. Transfer clutch 306 also includes an axially moveable apply plate 318 that is operable in a first or "released" position to exert a minimum clutch engagement force on clutch pack 316 and in a second or "engaged" position to exert a maximum clutch engagement force on clutch pack 316. With apply plate 318 in its first position, transfer clutch 306 is operating in a released mode such that no drive torque is transferred from input shaft 42 to pinion shaft 44. In contrast, transfer clutch 306 is operating in its locked mode when apply plate 318 is in its second position. As such, variable control over the axial position of apply plate 318 between its first and second positions permits adaptive control over the amount of drive torque transferred from input shaft 42 to pinion shaft 44.

Pump 304 is shown as a gerotor-type pump having an inner pump component or rotor 320 and an outer pump component or rotor 322. As will be described, inner pump rotor 320 is adapted to be selectively coupled to input shaft 42 through actuation of pump clutch 308. Outer pump rotor 322 surrounds inner pump rotor 320 and is seated within an eccentric chamber formed between a pump case 324 and a pump cover 326, which together define a pump housing 328. Pump housing 328 is supported in housing 302 for non-rotary axial movement on input shaft 42. Pump housing 328 may be splined, keyed or coupled by dowel pins to housing 302 to provide the anti-rotation feature. Pump clutch 308 is operable in a first or "engaged" state and inner pump rotor 320 is coupled for rotation with input shaft 42 when pump housing 328 is located in a first or extended position. In contrast, pump clutch 308 is operable in a second or "disengaged" state and inner pump rotor 320 is uncoupled from driven rotation with input shaft 42 when pump housing 328 is located in a second or retracted position. As understood, pump 304 is functional to supply pressurized fluid for lubrication and cooling purposes to various components within torque transfer mechanism 300 when pump clutch 308 is in its engaged state. Likewise, pump 304 does not generate such pumping action when pump clutch 308 is in its disengaged state.

Pump clutch 308 is shown to include a drive member which rotates with input shaft 42 and a driven member associated with one of the rotary pump components of pump 304. In particular, the drive member is a drive hub 370 that is fixed (i.e., splined) for rotation with input shaft 42 and which defines an annular rim 372 having an external conical surface formed thereon. The driven member includes an annular rim 374 extending from inner pump rotor 320 which has an internal conical surface formed thereon. A return spring 376 is disposed between housing 302 and pump housing 328 for normally biasing pump housing 328 toward its second position so as to normally place pump clutch 308 in its disengaged state. With pump clutch 308 in its disengaged state, the conical surface on rim 374 of inner pump rotor 320 is displaced from frictional engagement with the conical surface on rim 372 of drive hub 370, thereby releasing inner pump rotor 320 from driven connection with input shaft 42. In contrast, movement of pump housing 328 from its second position to its first position, in opposition to the biasing of return spring 376, causes rim 374 on inner rotor 320 to frictionally engage rim 372 on drive hub 370 for coupling inner rotor 320 for rotation with input shaft 42, thereby shifting pump clutch 308 into its engaged state.

Clutch actuation mechanism 310 is operable to control movement of pump housing 328 between its first and second positions in coordination with movement of apply plate 318 between its first and second position. In this regard, clutch actuation system 310 includes an electric motor 332, a reduction geartrain 334 and a clutch control gear 336. Geartrain 334 includes a first gear 338 driven by motor 332, a second gear 340 meshed with first gear 338, a third gear 342 commonly driven with second gear 340, and a fourth gear 344 meshed with third gear 342. As is understood, reduction geartrain 334 is merely exemplary of any suitable gear arrangement operable for reducing the output speed of an electric motor for the purpose of controlling actuation of a rotary device. As seen, fourth gear 344 is meshed with control gear 336 which is rotatably supported by a bearing assembly 346 on input shaft 42. Control gear 336 includes an axial hub segment 348 on which apply plate 318 is slideably supported.

Clutch actuation mechanism 310 is operable to convert rotary motion of control gear 336 into axial movement of pump housing 328 and apply plate 318. To this end, clutch actuation mechanism 310 defines a first camming arrangement between control gear 336 and apply plate 318 and a second camming arrangement between control gear 336 and pump housing 328. The first camming arrangement includes a first cam operator comprised of a pair of first rollers 350 that are rotatably journalled on pins 352 mounted to control gear 336 and a first cam plate 354 that is supported on hub segment 348 adjacent to apply plate 318. First rollers 350 are preferably oriented to be spaced 180° apart to engage a pair of similar first cam surfaces 356 formed on first cam plate 354. A thrust bearing unit 358 is provided between first cam plate 354 and apply plate 318. The profile of first cam surfaces 356 is designed to cause axial movement of apply plate 318 between its first and second positions in response to controlled bi-directional rotation of control gear 336 through a predefined range of angular travel.

The second camming arrangement includes a second cam operator comprised of a pair of second rollers 360 that are rotatably journalled on pins 262 mounted to control gear 336 and a second cam plate 364 provided between control gear 336 and pump housing 328. In the embodiment shown, second cam plate 364 is formed integrally with a portion of pump case 324. Second rollers 360 are oriented to be spaced 180° apart and engage a pair of second cam surfaces 366 formed on second cam plate 364. The profile of second cam surfaces 366 is designed to cause axial movement of pump housing 328 between its first and second positions in response to controlled bi-directional rotation of control gear 336 through a predefined range of angular travel. It is contemplated that pump clutch 308 would be shifted into its engaged state prior to actuation of transfer clutch 306 to assure that pump 304 is pumping lubricating/cooling fluid to clutch pack 316.

Figure 9:
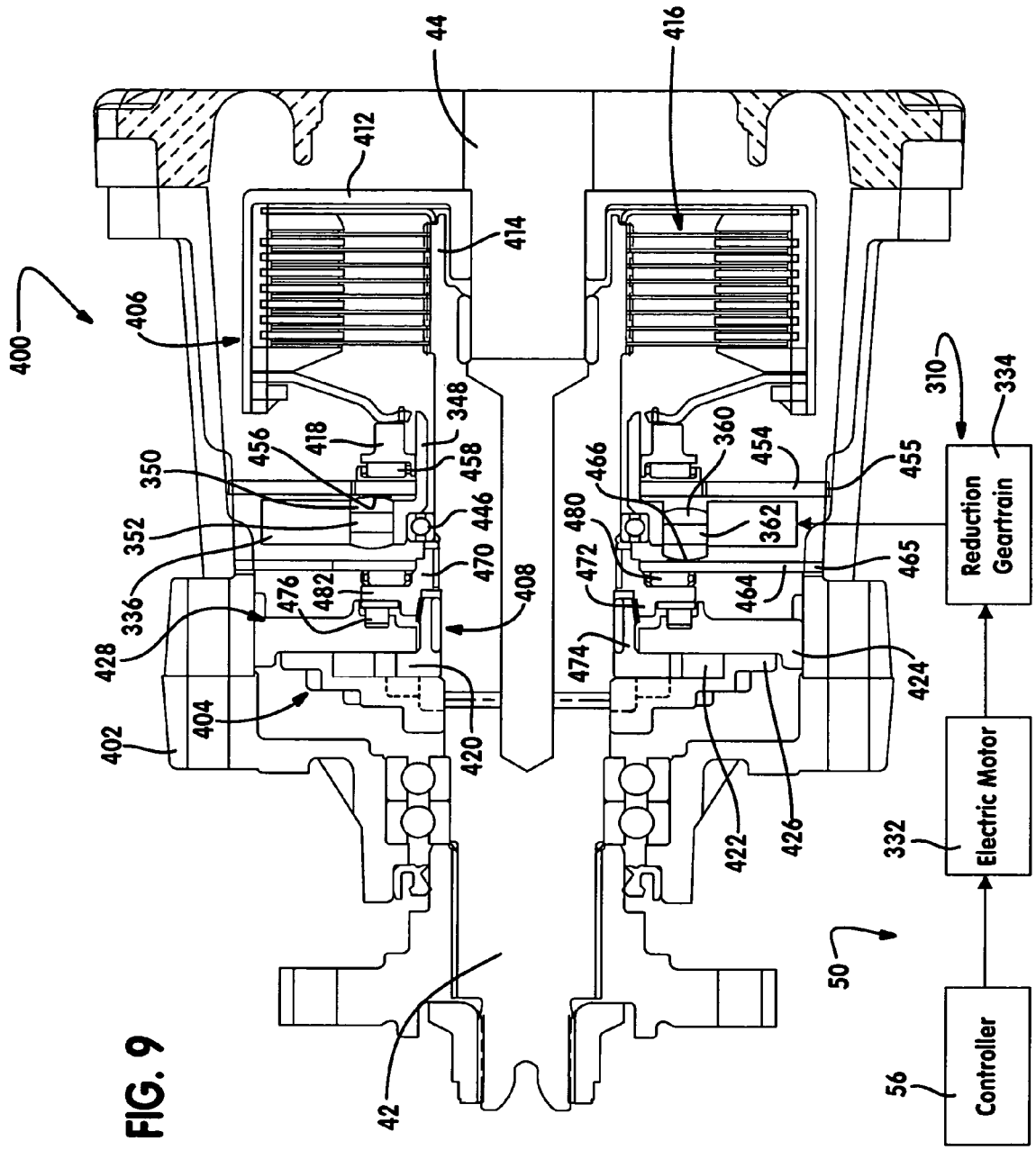
FIG. 9 is a sectional view of a torque transfer mechanism having a clutch actuation system operable for controlling actuation of a pump clutch for selectively engaging a fluid pump in coordination with actuation of a torque transfer clutch in accordance with an alternative embodiment of the present invention.

Referring now to FIG. 9, a sectional view of a torque transfer mechanism 400 is illustrated. Torque transfer mechanism 400 includes a housing 402 that encloses a hydraulic pump 404, a transfer clutch 406, a pump clutch 408 and clutch actuation system 310. In operation, input shaft 42 is selectively coupled to pinion shaft 44 via engagement of transfer clutch 406. Hydraulic pump 404 is selectively operable to provide pressurized fluid for cooling transfer clutch 406 and/or other rotary components based on rotation of input shaft 42 while pump clutch 408 functions to selectively couple a pump component of fluid pump 404 for rotation with input shaft 42. As will be detailed, clutch actuation system 310 functions to control actuation of transfer clutch 406 in coordination with actuation of pump clutch 408.

Transfer clutch 406 is shown to include a drum 412 that is fixed for rotation with pinion shaft 44, a clutch hub 414 that is fixed for rotation with input shaft 42, and a multi-plate clutch pack 416 having first clutch plates splined to drum 412 which are interleaved with second clutch plates splined to hub 414. Transfer clutch 406 also includes an axially moveable apply plate 418 that is operable in a first or "released" position to exert a minimum clutch engagement force on clutch pack 416 and in a second or "engaged" position to exert a maximum clutch engagement force on clutch pack 416. With apply plate 418 in its first position, transfer clutch 406 is operating in a released mode such that no drive torque is transferred from input shaft 42 to pinion shaft 44. In contrast, transfer clutch 406 is operating in its locked mode when apply plate 418 is in its second position. As such, variable control over the axial position of apply plate 418 between its first and second positions permits adaptive control over the drive torque transferred from input shaft 42 to pinion shaft 44.

Pump 404 is shown as a gerotor-type pump having an inner pump component or rotor 420 and an outer pump component or rotor 422. As will be described, inner pump rotor 420 is adapted to be selectively coupled to input shaft 42 through actuation of pump clutch 408. Outer pump rotor 422 surrounds inner pump rotor 420 and is seated within an eccentric chamber formed between a pump case 424 and a pump cover 426 which together define a pump housing 428. In this particular embodiment, pump housing 428 is fixed to housing 402 so as to prevent both rotational and axial sliding movement. Pump clutch 408 is operable in a first or "engaged" state to couple inner rotor 420 for rotation with input shaft 42. In contrast, pump clutch 408 is operable in a second or "disengaged" state to de-couple inner rotor 320 from driven rotation with input shaft 42. As understood, pump 404 is functional to supply pressurized fluid for lubrication and cooling purposes to various components within torque transfer mechanism 400 when pump clutch 408 is in its engaged state. Likewise, pump 404 does not generate such pumping action when pump clutch 408 is in its disengaged state.

Pump clutch 308 is shown to include a drive member which rotates with input shaft 42 and a driven member associated with one of the rotary pump components of pump 404. In particular, the drive member is a drive hub 470 fixed (i.e., splined) for rotation with input shaft 42 and which defines an annular rim 472 having an internal conical surface formed thereon. Drive hub 470 is axially moveable relative to pump 404 between a first position and a second position for shifting pump clutch 408 between its engaged and disengaged states. The driven member includes an annular rim 474 extending from inner pump rotor 420 which has an external conical surface formed thereon. A return spring 476 is disposed between pump housing 428 and drive hub 470 for normally biasing drive hub 470 toward its second position so as to normally place pump clutch 408 in its disengaged state. With pump clutch 408 in its disengaged state, the conical surface on rim 472 of drive hub 470 is displaced from frictional engagement with the conical surface on rim 474 of inner pump rotor 420, thereby releasing inner rotor 420 from driven connection with input shaft 42. In contrast, movement of drive hub 470 from its second position to its first position, in opposition to the biasing of return spring 476, causes rim 472 on drive hub 470 to frictionally engage rim 474 on inner rotor 420, thereby coupling inner rotor 420 for rotation with input shaft 42 and shifting pump clutch 408 into its engaged state.

Clutch actuation mechanism 310 is operable to control movement of drive hub 470 between its first and second positions in coordination with movement of apply plate 418 between its first and second position. In this regard, clutch actuation system 310 includes an electric motor 332, a reduction geartrain 334 and a clutch control gear 336. As is understood, reduction geartrain 334 is merely exemplary of any suitable gear arrangement operable for reducing the output speed of an electric motor for the purpose of controlling actuation of a rotary device. As seen, control gear 336 is rotatably supported by a bearing assembly 446 on input shaft 42. Control gear 336 includes an axial hub segment 348 on which apply plate 418 is slideably supported.

Clutch actuation mechanism 310 is operable to convert rotary motion of control gear 336 into axial movement of drive hub 470 and apply plate 418. To this end, clutch actuation mechanism 310 defines a first camming arrangement between control gear 336 and apply plate 418 and a second camming arrangement between control gear 336 and drive hub 470. The first camming arrangement includes a first cam operator comprised of a pair of first rollers 350 rotatably journalled on pins 352 mounted on control gear 336 and a first cam plate 454 supported on hub segment 348 adjacent to apply plate 318. First cam plate 454 is supported for non-rotary axial sliding movement on hub 348 via a splined connection 455 to housing 402. Rollers 350 are preferably oriented 180° to engage a pair of similar first cam surfaces 456 formed on first cam plate 454. A thrust bearing unit 458 is provided between first cam plate 454 and apply plate 418. The profile of first cam surfaces 456 is designed to cause axial movement of first cam plate 454 in response to rotation of control gear 336 through a predefined range of angular travel which, in turn, causes apply plate 418 to move between its first and second positions.

The second camming arrangement includes a second cam operator comprised of a pair of second rollers 360 rotatably journalled on pins 362 mounted to control gear 336 and a second cam plate 464 provided between control gear 336 and drive hub 470. In the embodiment shown, second cam plate 464 is supported for non-rotary axial sliding movement via a splined connection 465 to housing 402. Rollers 360 are oriented 180° and engage a pair of similar second cam surfaces 466 formed on second cam plate 464. A thrust bearing unit 480 is provided between second cam plate 464 and a radial flange segment 482 of drive hub 470. The profile of second cam surfaces 466 is designed to cause axial movement of second cam plate 464 in response to controlled bi-directional rotation of control gear 336 through a predefined range of angular travel which, in turn, causes drive hub 470 to move between its first and second positions. It is contemplated that pump clutch 408 would be shifted into its engaged state prior to actuation of transfer clutch 406 to assure that pump 404 is pumping lubricating/cooling fluid to clutch pack 416.

A number of preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A torque coupling, comprising:
   a first rotary member;
   a second rotary member;
   a transfer clutch operably disposed between said first and second rotary members;
   a fluid pump operable for generating a fluid pumping action;
   a pump clutch operably disposed between said fluid pump and one of said first and second rotary members;
   a clutch actuator having a rotary control member and first and second cam operators, said first cam operator is disposed between said control member and said transfer clutch for controlling engagement of said transfer clutch in response to rotation of said control member through a first range of travel, and said second cam operator is disposed between said control member and said pump clutch for controlling engagement of said pump clutch in response to rotation of said control member through a second range of travel; and
   a control system for controlling rotation of said control member.

2. The torque coupling of claim 1 wherein said pump clutch includes a moveable clutch component that is operable in a first position to couple said fluid pump to said first rotary member and in a second position to uncouple said fluid pump from said first rotary member, and wherein said second cam operator is disposed between said control member and said moveable clutch component of said pump clutch.

3. The torque coupling of claim 2 wherein said second cam operator includes a follower located between said control member and a cam surface on a cam plate such that rotation of said control member causes said follower to engage said cam surface and move said cam plate for moving said clutch component between its first and second positions.

4. The torque coupling of claim 2 wherein said moveable clutch component of said pump clutch is a drive hub fixed for rotation with said first rotary member, wherein said drive hub is operable in its first position to engage a pump component of said fluid pump and cause said pump component to be driven by said first rotary member, and wherein said drive hub is further operable in its second position to release said pump component of said fluid pump from driven connection with said first rotary member.

5. The torque coupling of claim 2 wherein said moveable clutch component of said pump clutch is fixed to a pump component of said fluid pump, wherein said pump component is operable in its first position to engage a non-moveable second clutch component of said pump clutch that is driven by said first rotary member for establishing a drive connection between said first rotary member and said pump component, and wherein said pump component is operable in its second position to be released from engagement with said second clutch component to release said pump component from driven connection with said first rotary member.

6. The torque coupling of claim 2 wherein said control member is a control gear, and wherein said control system includes an electric motor driving a gearset for controlling rotation of said control gear.

7. The torque coupling of claim 6 wherein said first cam operator includes a first follower located between said control gear and a first cam surface on a first cam plate such that rotation of said control gear causes said first follower to engage said first cam surface and move said first cam plate for moving a moveable clutch component of said transfer clutch, and wherein said second cam operator includes a second follower located between said control gear and a second cam surface on a second cam plate such that rotation of said control gear causes said second follower to engage said second cam surface and move said second cam plate for moving said moveable clutch component of said pump clutch.

8. The torque coupling of claim 7 wherein said moveable clutch component of said transfer clutch is an apply plate supported for movement between first and second positions relative to a clutch pack disposed between said first and second rotary members, wherein said apply plate is operable in its first position to engage said clutch pack and in a second position to release said clutch pack, and wherein said first cam operator is disposed between said control gear and said apply plate.

9. The torque coupling of claim 7 wherein said moveable clutch component of said pump clutch is a drive hub fixed for rotation with said first rotary member, wherein said drive hub is operable in its first position to engage a pump component of said fluid pump and cause said pump component to be driven by said first rotary member, and wherein said drive hub is further operable in its second position to release said pump component of said fluid pump from driven connection with said first rotary member.

10. The torque coupling of claim 7 wherein said moveable clutch component of said pump clutch is fixed to a pump component of said fluid pump, wherein said pump component is operable in its first position to engage a non- moveable second clutch component of said pump clutch that is driven by said first rotary member for establishing a drive connection between said first rotary member and said pump component, and wherein said pump component is operable in its second position to be released from engagement with said second clutch component to release said pump component from driven connection with said first rotary member.

11. The torque coupling of claim 1 wherein said pump clutch includes a drive hub fixed for rotation with and axial sliding movement on said first rotary member between first and second positions, wherein said drive hub is operable in its first position to engage a pump component of said fluid pump and cause said pump component to be driven by said first rotary member, wherein said drive hub is operable in its second position to release said pump component of said fluid pump from driven connection with said first rotary member, wherein said pump clutch includes a return spring for normally biasing said drive hub toward its second position, and wherein said second cam operator is operable for controlling movement of said drive hub between its first and second positions in response to rotation of said control member.

12. The torque coupling of claim 11 wherein said second cam operator includes a cam plate disposed between said control member and said drive hub that is operable for converting rotary movement of said control member into axial movement of said drive hub between its first and second positions.

13. The torque coupling of claim 1 wherein said pump clutch includes a first clutch component fixed for rotation with said first rotary member and a second clutch component fixed for rotation with a pump component of said fluid pump, wherein said second clutch component is axially moveable between first and second positions relative to said first clutch component, said second clutch component is operable in its first position to engage said first clutch component and establish a drive connection between said pump component and said first rotary member and said second clutch component is operable in its second position to release said drive connection between said pump component and said first rotary member, and wherein said second cam operator is operable to cause movement of said second clutch component between its first and second positions in response to rotation of said control member.

14. The torque coupling of claim 13 wherein said second cam operator includes a cam plate disposed between said control member and said second clutch component that is operable to convert rotary movement of said control member into axial movement of said second clutch component between its first and second positions.

15. The torque coupling of claim 1 wherein said first rotary member is supplied with drive torque from a vehicle powertrain, wherein said second rotary member is coupled to a vehicle driveline, wherein said transfer clutch is operable for transferring drive torque from said first rotary member to said second rotary member, and wherein said fluid pump is operable to lubricate components of said transfer clutch.

16. The torque coupling of claim 1 wherein said control member is supported for rotation relative to said first rotary member and includes first and second rollers, wherein said first cam operator includes a first cam having a first cam surface engaged by said first roller and said second cam operator includes a second cam having a second cam surface engaged by said second roller, wherein rotation of said control member in a first direction causes said first roller to move said first cam for engaging said transfer clutch and causes said second roller to move said second cam for engaging said pump clutch.

17. The torque coupling of claim 16 wherein said control member is disposed between said first and second cams, and wherein said clutch actuator further includes a power-operated device for causing rotation of said control member.

18. A power transfer assembly, comprising:
a rotary input member adapted to receive drive torque from a power source;

a rotary output member adapted to provide drive torque to an output device;

a torque transfer mechanism for transferring drive torque from said input member to said output member, said torque transfer mechanism including a transfer clutch operably disposed between said input member and said output member, an apply plate for applying a clutch engagement force to said transfer clutch, a fluid pump having a pump component, a pump clutch operable for selectively coupling said pump component for rotation with one of said input and output members, and a clutch actuation mechanism for coordinating actuation of said transfer clutch with said pump clutch, said clutch actuation mechanism including a control member rotatably supported on said input member between said friction clutch and said pump clutch, a first cam operator disposed between said control member and said apply plate and which is operable for converting rotation of said control member into axial movement of said apply plate relative to said transfer clutch, and a second cam operator disposed between said control member and said pump clutch and which is operable for converting rotation of said control member into axial movement of said pump clutch relative to said pump component; and a control system for controlling rotation of said control member.

19. The power transfer assembly of claim 18 wherein said pump clutch includes a moveable clutch component that is operable in a first position to couple said pump component of said fluid pump to said rotary input member and in a second position to uncouple said pump component of said fluid pump from said rotary input member, and wherein said second cam operator is disposed between said control member and said moveable clutch component of said pump clutch.

20. The power transfer assembly of claim 19 wherein said moveable clutch component of said pump clutch is a drive hub fixed for rotation with said rotary input member, wherein said drive hub is operable in its first position to engage said pump component of said fluid pump and cause said pump component to be driven by said rotary input member, and wherein said drive hub is further operable in its second position to release said pump component of said fluid pump from driven connection with said rotary input member.

21. The power transfer assembly of claim 19 wherein said moveable clutch component of said pump clutch is fixed to said pump component of said fluid pump, wherein said pump component is operable in its first position to engage a non-moveable second clutch component of said pump clutch that is driven by said rotary input member for establishing a drive connection between said rotary input member and said pump component, and wherein said pump component is operable in its second position to be released from engagement with said second clutch component to release said pump component from driven connection with said rotary input member.

22. The power transfer assembly of claim 18 wherein said control system includes an electric motor for controlling rotation of said control member.

23. The power transfer assembly of claim 18 wherein said first cam operator includes a first follower located between said control member and a first cam surface on a first cam member such that rotation of said control member causes said first follower to engage said first cam surface and move said first cam member for moving said apply plate relative to said transfer clutch, and wherein said second cam operator includes a second follower located between said control member and a second cam surface on a second cam member such that rotation of said control member causes said second follower to engage said second cam surface and move said second cam member for moving a moveable clutch component of said pump clutch relative to said fluid clutch.

24. The power transfer assembly of claim 18 wherein said control member is supported for rotation relative to said rotary input member and includes first and second rollers, wherein said first cam operator includes a first cam member having a first cam surface engaged by said first roller and said second cam operator includes a second cam member having a second cam surface engaged by said second roller, wherein rotation of said control member in a first direction causes said first roller to move said first cam member for causing said apply plate to engage said transfer clutch and also causes said second roller to move said second cam for engaging said pump clutch.

* * * * *

UNITED STATES PATENT AND TRADEMARK OFFICE
CERTIFICATE OF CORRECTION

PATENT NO.      : 7,635,055 B2                                  Page 1 of 1
APPLICATION NO. : 11/518607
DATED           : December 22, 2009
INVENTOR(S)     : Ekonen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 499 days.

Signed and Sealed this

Ninth Day of November, 2010

David J. Kappos
*Director of the United States Patent and Trademark Office*